March 22, 1966  G. M. BARRETT  3,241,463
VARIABLE POWER EXCHANGER
Filed July 1, 1964  2 Sheets-Sheet 1
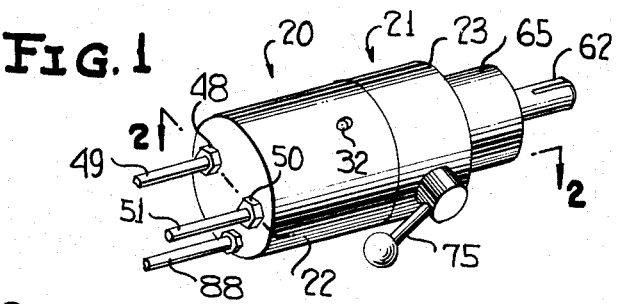
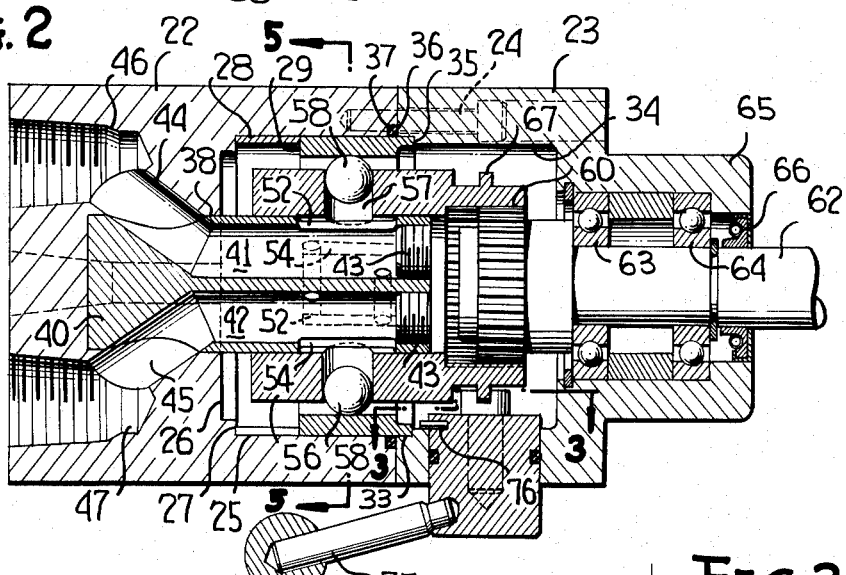
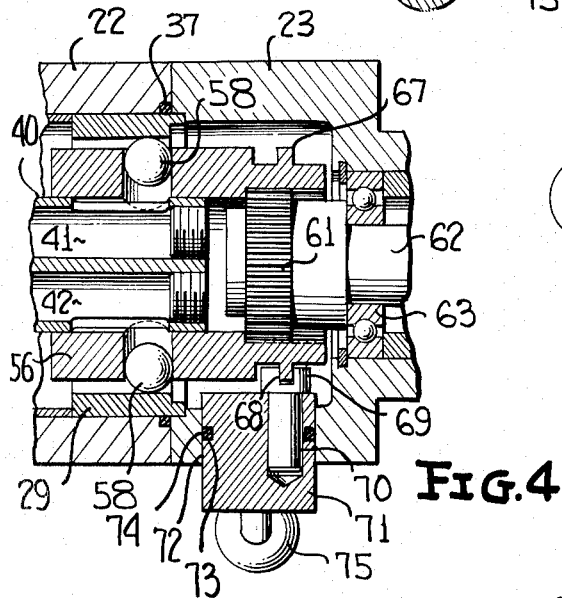
INVENTOR
GEORGE M. BARRETT
BY
ATTORNEYS March 22, 1966 G. M. BARRETT 3,241,463
VARIABLE POWER EXCHANGER
Filed July 1, 1964
2 Sheets-Sheet 2
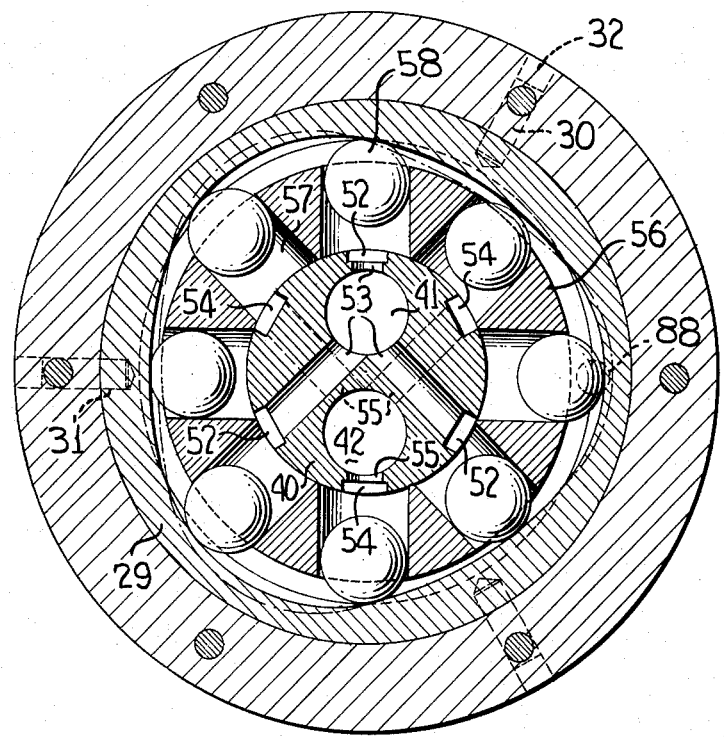
FIG. 5
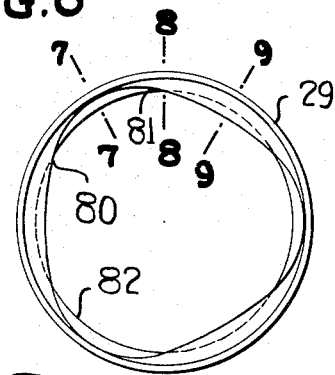
FIG. 6
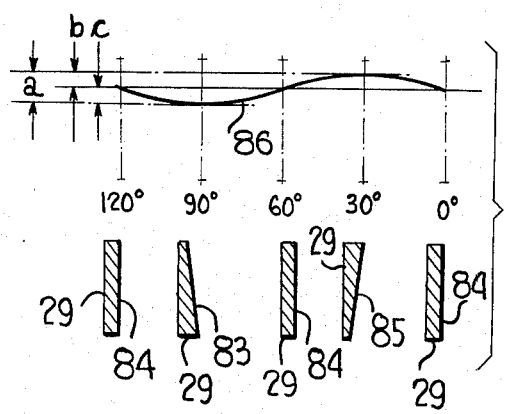
FIG. 10
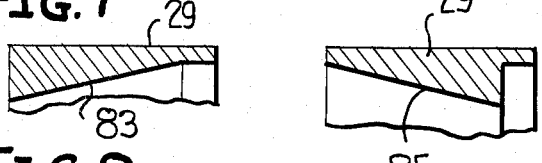
FIG. 7
FIG. 9
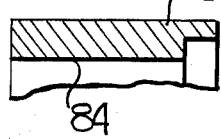
FIG. 8
INVENTOR
GEORGE M. BARRETT
BY
Mason, Porter, Diller & Stewart
ATTORNEYS

United States Patent Office 3,241,463
Patented Mar. 22, 1966

3,241,463
VARIABLE POWER EXCHANGER
George M. Barrett, R.R. 5, Galt, Ontario, Canada
Filed July 1, 1964, Ser. No. 379,487
10 Claims. (Cl. 92—13)

This invention relates in general to new and useful improvements in power exchangers of the hydraulic type, and more particularly to a power exchanger wherein the exchange of power may be readily varied.

This invention constitutes an improvement on the rotary hydraulic motor specifically disclosed in my Patent No. 3,037,488, granted June 5, 1962, and employs many of the principles of that motor.

It is well known to provide variable speed hydraulic motors wherein the surfaces of a cam track thereof are longitudinally sloped to vary displacement between a maximum and a minimum. However, such variable speed hydraulic motors have the deficiency in that the longitudinal sloping of the cam track surfaces continuously imparts oppositely directed longitudinal forces on the cam track and the pistons with the result that it is virtually impossible to maintain an adjusted relative position of the pistons and cam track, and the means for relatively longitudinally shifting the pistons and cam track required too great an input of force to be practical.

In view of the foregoing, it is the primary object of this invention to provide a variable speed hydraulic motor of the type which includes a cam track and pistons riding on the cam track wherein the forces which tend to effect relative longitudinal movement of the cam track and piston are balanced at all times.

Another object of this invention is to provide a variable speed rotary hydraulic motor of the type including a cam track wherein the means for effecting relative longitudinal shifting of the cam track and pistons of the motor may be extremely simple and of a type which is required to overcome only vibrational forces to retain the cam track and the pistons in longitudinally adjusted relative positions.

Another object of this invention is to provide a novel hydraulic motor of the rotary type which includes a cam track for effecting the reciprocation of pistons wherein the cam track is so configurated that the relative positions of the cam track and the pistons may be adjusted to provide not only a variation between maximum output and no output, but also a reversal of direction of rotation of the motor.

Still another object of this invention is to provide a variable speed motor which may be driven by an external power source and utilized as a pump.

Still another object of this invention is to provide a variable speed motor having a cam track therein which provides for a balanced relationship of forces at all times in a longitudinal direction and which is so configurated whereby there may be associated therewith a plurality of rows of pistons.

A still further object of this invention is to provide a variable power exchanger which may be alternatively utilized as a pump or a motor and which power exchanger may be readily adjusted so as to provide for both a variation in power exchange and for a reversal in the direction of fluid flow therethrough.

With the above and other objects in view that will hereinafter appear, the nature of the invention will be more clearly understood by reference to the following detailed description, the appended claims and the several views illustrated in the accompanying drawings.

In the drawings:
FIGURE 1 is a perspective view of the power exchanger of this invention and shows the general details thereof.
FIGURE 2 is an enlarged longitudinal sectional view taken along the line 2—2 of FIGURE 1 and shows the internal construction of the power exchanger.

FIGURE 3 is an enlarged fragmentary sectional view taken along the line 3—3 of FIGURE 2 and shows more specifically the details of the mechanism for longitudinally shifting a rotor of the power exchanger with respect to the cam track thereof.

FIGURE 4 is an enlarged fragmentary sectional view similar to FIGURE 2 but on a larger scale, with the rotor in a shifted position relative to the position shown in FIGURE 2.

FIGURE 5 is a rotated enlarged fragmentary transverse vertical sectional view taken along the line 5—5 of FIGURE 2 and shows more of the details of the power exchanger.

FIGURE 6 is an end view on the same scale as FIGURE 2 of the cam track removed from the remainder of the power exchanger and shows the specific configuration thereof.

FIGURES 7, 8 and 9 are longitudinal sectional views taken along the section lines 7—7, 8—8 and 9—9, respectively of FIGURE 6 and shows the variations in longitudinal cross section of the cam track at circumferentially spaced points.

FIGURE 10 is a schematic view correlating the longitudinal forces on a piston as it travels through a full thrust cycle along the cam track and shows the associated cross sections of the cam track at various points along the thrust cycle.

Referring now to the drawings in detail, it will be seen that there is illustrated in FIGURE 1 a variable power exchanger formed in accordance with this invention. For purpose of description, the variable power exchanger will be described as a hydraulic motor and is generally referred to by the numeral 20. The hydraulic motor 20 includes a two-piece housing, which is generally referred to by the numeral 21. The housing 21 includes a first housing member 22 and a second housing member 23 whereby the housing 21 is transversely slit. The housing member 22 is removably secured to the housing member 23 by means of a plurality of circumferentially spaced bolts which are best shown in FIGURE 2, the bolts being referred to by the numeral 24.

Referring now to FIGURE 2 in particular, it will be seen that the right end of the housing member 22 has a large diameter bore 25 formed therein. The bore 25 opens out through the right end of the housing member 22. At the left end of the bore 25, the housing member 22 has a shallow reduced diameter bore 26 with the result that there is an annular shoulder 27 between the bores 25 and 26. A suitable spacing ring 28 is placed within the bore 25 in abutment with the shoulder 27. A cam track 29 is then inserted into the bore 25 in abutment with the spacing ring 28. It is to be noted that the cam track 29 extends out beyond the right end of the housing member 22. The cam track 29, which has a cylindrical outer surface, is fixed within the housing member 22 against rotation by means of a plurality of set screws 30 (FIGURE 5) which extend down into shallow bores 31 in the cam track 29. The set screws 30 are threaded into bores 32 in the housing member 22.

It is to be noted that the housing member 23 is provided at the left end thereof with a relatively shallow bore 33 which opens into a relatively deep smaller diameter bore 34. The difference in diameters of the bores 33 and 34 results in the formation of an annular shoulder 35 which faces to the left and which abuts against the right end of the cam track to accurately position the cam track 29. The extreme right end of the housing member 22 is provided with a shallow annular groove 36 surrounding the bore 25. An O-ring 37 is seated in the annular groove 36 and bears against the housing members 22 and 23 and the cam track 29 to form a seal between the abutting faces of the housing members 22 and 23.

The housing member 22 is provided with a further bore 38 which is disposed inwardly of the bore 26. The bore 38 has positioned therein one end of a stator 40 which is positioned along the axis of the housing 21. It is to be noted that the stator 40 is formed separately and apart from the housing member 22 and has a press fit thereinto although it could be of a one-piece construction with the housing member 22. It will be readily apparent that for simplicity of machining, it is desirable to form the stator 40 separately from the housing member 22.

The stator 40 has a pair of longitudinal flow passages 41 and 42 extending therethrough. The right ends of the flow passages 41 and 42 are closed by means of suitable plugs 43. The left end of each of the flow passages 41 and 42 extends angularly in opposite directions out of the stator 40 and opens into flow passages 44 and 45, respectively, formed within the housing member 22. The flow passages 44 and 45 open into bores 46 and 47, respectively, formed in the left end of the housing member 22 and opening therethrough. It is to be noted that the outer portions of the bores 46 and 47 are internally threaded for the reception of a suitable pipe fitting. In FIGURE 1 a pipe fitting 48 is illustrated as being threaded into the bore 46 and connecting a pipe 49 thereto. A similar pipe fitting 50 is threaded into the bore 47 and connects a pipe 51 thereto.

Referring now to FIGURE 5 in particular, it will be seen that the stator 40 has formed in the circumference thereof a plurality of circumferentially spaced ports 52. The ports 52 are connected to the flow passage 41 by means of flow passages 53. A similar number of ports 54 are formed in the exterior surface of the stator 40 in circumferentially spaced relation and in alternating relation with respect to the ports 52. The ports 54 are connected to the flow passage 42 by means of flow passages 55. It is to be noted that the ports 52 and 54 are of a limited circumferential extent, but at the same time are relatively long longitudinally, as is clearly shown in FIGURES 2 and 5.

The outer surface of the stator 40 is machined to form a bearing surface and has rotatably journalled thereon a rotor 56. The rotor 56 is provided with a plurality of bores therethrough defining cylinders 57. As is best shown in FIGURE 5, there is an even number of cylinders 57 while there is an odd number of the ports 52 and the ports 54. It is to be noted that the number of cylinders exceeds the number of ports. It is also to be noted that each of the cylinders 57 is centered along a radial line from the center of the stator and that the inner ends of the cylinders 57 are closely adjacent to one another. Within each of the cylinders 57 there is mounted for reciprocatory movement a piston 58. The illustrated pistons are in the form of balls although it is feasible that they could be in the form of rods having semi-spherical outer ends.

The right-hand end of the rotor 56 has an internally splined bore 60 in which there is received an externally splined end portion 61 of a shaft 62. The shaft 62 is rotatably journalled in a pair of bearings 63 and 64 which are suitably mounted in a reduced extension 65 of the housing member 23. The outward flow of hydraulic fluid from the housing member 23 around the shaft 62 is prevented by means of a seal 66. It is to be understood that the manner in which the shaft 62 is mounted in the housing member 23 may be of a conventional design and in itself is not a part of this invention.

At this time it is pointed out that the internally splined bore 60 is of a greater depth than the thickness of the end portion 61 and the shaft 62. It is intended that the rotor 56 be longitudinally reciprocable within the housing 21 while the shaft 62 is fixed against longitudinal movement. In order that the rotor 56 may be longitudinally reciprocated and thereby moved to a desired longitudinal position with respect to the cam track 29, the right end of the rotor 56 is of a reduced external diameter to define an annular collar 67. The annular collar 67 rides in a slot 68 formed in a head 69 of a replaceable connector 70 which is rotatably mounted within a short shaft-like member 71. It is to be noted that the mounting of the connector 69 in the shaft-like member 71 is an eccentric one so that when the shaft-like member 71 is rotated, the connector 69 will shift longitudinally of the housing 21 and thus shift the rotor 56 longitudinally of the housing 21.

The housing member 23 is provided with a radial bore 72 in which the shaft-like member 71 is mounted for rotation. The shaft-like member 71 is provided with an annular groove 73 in which there is positioned an O-ring 74 to provide a seal between the shaft-like member 71 and the housing member 23. The O-ring 74 also serves as a friction member to retain the shaft-like member 71 in an adjusted position. The shaft-like member 71 also is provided with a control arm 75 to facilitate the rotation thereof. A pin 76 retains the shaft-like member 71 in the bore 72.

It will be readily apparent from the foregoing that the hydraulic motor 20, as described above, with the exception of the shiftable feature of the rotor 56, would function the same as the hydraulic motor of my Patent No. 3,037,488 if the cam track 29 were of the type specifically illustrated and described in my prior patent. However, the hydraulic motor of my prior patent is controlled solely by the flow of hydraulic fluid thereto and therefrom. It has been found that by longitudinally varying the cross section of the cam track cam surface, both the speed and direction of rotation can be varied. The cam track 29 has an inner cam surface which may be considered as divided into three different portions which gradually merge one to the other. These include two end portions which in the illustrated form of the cam track have three lobes and each of the lobes includes a pair of similar thrust surfaces 80, 81. The central portion of the cam track is cylindrical as is defined by the line 82 in FIGURE 6. Furthermore, it will be seen that the lobes of the two end portions of the cam track 29 are disposed outerface so that the high point of a lobe at one end of the cam track is aligned with a low point of a like lobe at the opposite end of the cam track.

Referring specifically to FIGURES 7, 8 and 9 at this time in comparison with FIGURE 6, it will be seen that starting at a low point on a lobe at one end of the cam track and proceeding to the opposite end, the cam track 29 has an inner cam surface which is linear and which slopes from a minimum to a maximum with the center of this line, which is referred to by the numeral 83, lying on the circle 82. On the other hand, if one takes a point along a lobe at the mid-height of the lobe, such as along the line 8—8 of FIGURE 6, it will be seen that the cam track surface is defined by a line 84 which is parallel to the axis of the cam track surface. Further, as is shown in FIGURE 9, when one goes from a point of minimum stroke at the left end of the cam track 29 along a longitudinal line, it will be seen that the cam surface is defined by a linear line 85 which slopes from left to right from a maximum stroke point to a minimum stroke point. The center of the line 85 also passes through the circle 82 on which the line 84 falls. It will thus be apparent that the longitudinal slope of circumferentially adjacent portions of the cam track varies with circumferentially adjacent portions of the cam track gradually changing in longitudinal slope from one extreme, such as that shown in FIGURE 7, through a condition of no slope, such as that shown in FIGURE 8, to the opposite extreme, such as that shown in FIGURE 9.

Reference is now made to FIGURE 10 wherein it will be seen that due to the reversing slope in a longitudinal direction of the surface of the cam track 29, the summation of forces in a longitudinal direction on either the cam track or the rotor 56 during the rotation of a piston through the complete cycle of one lobe is zero. Starting at the right of FIGURE 10 and reading to the left, it will be seen that the piston is shown at a position on the cam track 29 which corresponds to the section through line 8—8 thereof. At this point on the cam track 29, the particular piston is at the mid-point of its stroke. At this point there is no longitudinal thrust on either the cam track 29 or the particular one of the pistons 58. As the rotor rotates to move the piston towards a high point on the particular lobe, it will be seen that the longitudinal thrust in one direction gradually increases to a maximum at the high point on the lobe corresponding, for example, to the position shown in FIGURE 7. Assuming the piston to be at the left end of the cam track 29 in FIGURE 7, it will be seen that at this time there is a maximum thrust on the piston to the right. This is indicated by the magnitude $b$ of the thrust curve 86 in FIGURE 10 at the 30 degree point of the lobe.

As the rotor 56 continues to rotate, the piston is gradually forced inwardly by the cam track until it reaches the 60 degree point of its travel at which time the cam track is again longitudinally level and there is no thrust longitudinally on the piston. It will thus be seen that the thrust on the piston during the first part of the movement thereof around one lobe is to the right in the illustrated example. As the rotor 56 continues to rotate, the piston now rides on the reversely sloping part of the cam track 29 so that the thrust on the piston now becomes towards the left and a point of maximum thrust is reached at the 90 degree position of travel which corresponds to the cross section of the cam track shown in FIGURE 9. The amount of force to the left on the piston is indicated by the curve line 86 as being equal to the value $c$, which value $c$ is equal to the value $b$.

As further rotation of the rotor continues, the thrust on the piston to the left decreases until the piston reaches the 120 degree mark which in the case of a three lobe cam, corresponds to the zero mark, at which time there is no further longitudinal thrust. It will be apparent that the total magnitude of the thrust on the piston is equal to the value $a$ which equals value $b$ + value $c$. However, the total thrust to the right is equal to the total thrust to the left and in a complete cycle of movement of a piston along a lobe, the thrusts cancel one another. Furthermore, because there are eight pistons and only three lobes, it will be seen that the total sums of thrusts on the total pistons at one time will balance out. Therefore, despite the fact that the cam track 29 has longitudinally sloping surfaces, as is clearly shown in FIGURES 7, 8, 9 and 10, there is no resultant longitudinal thrust on either the cam track 29 or the rotor 56. Therefore, the rotor 56 will stay in any longitudinally adjusted position in which it is placed. Therefore, it is necessary only that the means for longitudinally shifting and positioning the rotor 56 be of sufficient resistance to movement to overcome any vibration which may possibly cause movement thereof.

It will be readily apparent that when the rotor 56 is in the position illustrated in FIGURE 2, since the surface of the cam track 29 is that of a circle, there will be no movement of the pistons 58 and therefore, no rotation of the rotor 56. On the other hand, if the rotor 56 is moved to the left in FIGURE 2, and fluid is supplied to the motor 20 through the fluid passage 41, the rotor 56 will rotate in a counterclockwise direction, as viewed in FIGURE 5. However, when the rotor 56 is moved to the right in FIGURE 2, the rotor will rotate in a clockwise direction with the fluid being supplied through the fluid passage 41. It is to be understood that the stroke of the pistons 58 will vary between zero at the center point of the cam track 29 to a maximum at the opposite ends thereof. Thus, not only may the direction of rotation of the rotor 56 be controlled, but also the speed of rotation and the torque output thereof may be controlled.

The relationship of the ports 52 and 54 with respect to the rotor 56 and the cylinders 57 thereof as well as the relationship of the pistons 58 to the configuration of the cam track 29 will be similar to that specifically set forth in my Patent No. 3,037,488 and will not be described in more detail here.

It is to be understood that there will be a minor amount of leakage of hydraulic fluid between the stator 40 and the rotor 56. This will provide the necessary lubrication for the rotation of the rotor 56. Furthermore, there will be a slight leakage of fluid pass the pistons 58. The fluid which escapes during the operation of the motor is collected in the bottom of the housing 21 and is removed therefrom through a drain line 88 at the end of the housing member 22, as is shown in FIGURE 1.

Although the illustrated motor 20 is of a single row of pistons design, it is to be understood that the motor 20 will function in a like manner if the cam track 29 is elongated and a plurality of rows of pistons are mounted in the rotor 56. Also, while the motor 20 is illustrated as having a rotor for the piston carrier and the cam track 29 as being stationary, it is to be understood that the cam track 29 could be rotated and connected to the output shaft 62 with the piston carrier being fixed. Of course, this would require a different type of porting. Further, it will be readily apparent that if the shaft 62 is driven, then the hydraulic unit illustrated in FIGURE 2 will function equally as well as a pump which has a variable output both as to volume and direction.

Although only a preferred embodiment of the invention has been specifically illustrated and described here, it is to be understood that minor variations may be made therein within the spirit and scope of the invention, as is defined by the appended claims.

I claim:

1. A variable power exchanger of the hydraulic type comprising a cam track, a piston carrier having a plurality of radially extending and circumferentially spaced cylinders, a piston freely positioned within each of said cylinders for reciprocatory movement, each piston being in contact with said cam track, means mounting said cam track and piston carrier for relative rotation, said cam track including end portions merging into a central portion, said central portion being circular and each of said end portions having a plurality of circumferential lobe shaped thrust surfaces, said thrust surfaces of said end portions being circumferentially out of phase with circumferentially adjacent portions of said cam track gradually changing in longitudinal slope from one extreme to the opposite extreme whereby at any one time the longitudinal forces on one half of said pistons are in one direction and the longitudinal forces on the other half of said pistons are in an opposite direction and of a like magnitude and the longitudinal forces on said cam track and said piston carrier are always balanced, and means for longitudinally relatively shifting said cam track and said piston carrier to vary both the direction and magnitude of power exchange.

2. A variable power exchanger of the hydraulic type comprising a cam track, a piston carrier having a plurality of radially extending and circumferentially spaced cylinders, a piston freely positioned within each of said cylinders for reciprocatory movement, each piston being in contact with said cam track, means mounting said cam track and piston carrier for relative rotation, said cam track including end portions merging into a central portion, said central portion being circular and each of said end portions having a plurality of circumferential lobe shaped thrust surfaces, said thrust surfaces of said end portions being circumferentially out of phase with circumferentially adjacent portions of said cam track gradually changing in longitudinal slope from one extreme to the opposite extreme along each thrust surface whereby at any one time the longitudinal forces on one half of said pistons are in one direction and the longitudinal forces on the other half of said pistons are in an opposite direction and of a like magnitude and the longitudinal forces on said cam track and said piston carrier are always balanced, and means for longitudinally relatively shifting said cam track and said piston carrier to vary both the direction and magnitude of power exchange.

3. A variable power exchanger of the hydraulic type comprising a cam track, a piston carrier having a plurality of radially extending and circumferentially spaced cylinders, a piston freely positioned within each of said cylinders for reciprocatory movement, each piston being in contact with said cam track, means mounting said cam track and piston carrier for relative rotation, said cam track including first and second longitudinally spaced portions, said first portion having a plurality of circumferential lobe shaped thrust surfaces and said second portion being circular with there being a gradual change in cross section of said cam track between said first and second portions and circumferentially adjacent portions of said cam track gradually changing in longitudinal slope from one extreme to the opposite extreme whereby at any one time the longitudinal forces on one half of said pistons are in one direction and the longitudinal forces on the other half of said pistons are in an opposite direction and of a like magnitude and the longitudinal forces on said cam track and said piston carrier are always balanced, and means for longitudinally relatively shifting said cam track and said piston carrier to vary the magnitude of power exchange.

4. A variable power exchanger of the hydraulic type comprising a cam track, a piston carrier having a plurality of radially extending and circumferentially spaced cylinders, a piston freely positioned within each of said cylinders for reciprocatory movement, each piston being in contact with said cam track, means mounting said cam track and piston carrier for relative rotation, said cam track including first and second longitudinally spaced portions, said first portion having a plurality of circumferential lobe shaped thrust surfaces and said second portion being circular with there being a gradual change in cross section of said cam track between said first and second portions and circumferentially adjacent portions of said cam track gradually changing in longitudinal slope from one extreme to the opposite extreme along each thrust surface whereby at any one time the longitudinal forces on one half of said pistons are in one direction and the longitudinal forces on the other half of said pistons are in an opposite direction and of a like magnitude and the longitudinal forces on said cam track and said piston carrier are always balanced, and means for longitudinally relatively shifting said cam track and said piston carrier to vary the magnitude of power exchange.

5. The power exchanger of claim 3 wherein each thrust surface includes a maximum piston displacement portion and a minimum piston displacement portion, and said circular portion lies half way between said maximum and minimum piston displacement portions.

6. The power exchanger of claim 1 wherein each thrust surface includes a maximum piston displacement portion and a minimum piston displacement portion, and said circular portion lies half way between said maximum and minimum piston displacement portions.

7. A variable speed fluid motor comprising a housing, a cam track fixed in said housing, a rotor rotatably journalled in said housing in alignment with said cam track, said rotor defining a plurality of circumferentially spaced radially arranged cylinders, a piston in each cylinder and in contact with said cam track, said cam track including end portions merging into a central portion, said central portion being circular and each of said end portions having a plurality of circumferential lobe shaped thrust surfaces, said thrust surfaces of said end portions being circumferentially out of phase with circumferentially adjacent portions of said cam track gradually changing in longitudinal slope from one extreme to the opposite extreme whereby at any one time the longitudinal forces on one half of said pistons are in one direction and the longitudinal forces on the other half of said pistons are in an opposite direction and of a like magnitude and the longitudinal forces on said cam track and said rotor are always balanced, and means for longitudinally shifting said rotor to vary the path of travel of said pistons on said cam track.

8. A variable speed fluid motor comprising a housing, a cam track fixed in said housing, a rotor rotatably journalled in said housing in alignment with said cam track, said rotor defining a plurality of circumferentially spaced radially arranged cylinders, a piston in each cylinder and in contact with said cam track, said cam track including first and second longitudinally spaced portions, said first portion having a plurality of circumferential lobe shaped thrust surfaces and said second portion being circular with there being a gradual change in cross section of said cam track between said first and second portions and circumferentially adjacent portions of said cam track gradually changing in longitudinal slope from one extreme to the opposite extreme whereby at any one time the longitudinal forces on one half of said pistons are in one direction and the longitudinal forces on the other half of said pistons are in an opposite direction and of a like magnitude and the longitudinal forces on said cam track and said rotor are always balanced, and means for longitudinally shifting said rotor to vary the path of travel of said pistons on said cam track.

9. A cam track comprising end portions merging into a central portion, said central portion being circular and each of said end portions having a plurality of circumferential lobe shaped thrust surfaces, said thrust surfaces of said end portions being circumferentially out of phase with circumferentially adjacent portions of said cam track gradually changing in longitudinal slope from one extreme to the opposite extreme.

10. A cam track comprising first and second longitudinally spaced portions, said first portion having a plurality of circumferential lobe shaped thrust surfaces and said second portion being circular with there being a gradual change in cross section of said cam track between said first and second portions and circumferentially adjacent portions of said cam track gradually changing in longitudinal slope from one extreme to the opposite extreme.

No references cited.

SAMUEL LEVINE, *Primary Examiner.*

I. C. COHEN, *Assistant Examiner.*